United States Patent
Wei et al.

(10) Patent No.: US 8,784,663 B2
(45) Date of Patent: Jul. 22, 2014

(54) TRAPPING NANOSTRUCTURES

(75) Inventors: Di Wei, Cambridge (GB); Zoran Radivojevic, Cambridge (GB); Markku Antti Kyosti Rouvala, Helsinki (FI); Teuvo Tapani Ryhänen, Cambridge (GB)

(73) Assignee: Nokia Corporation, Espoo (FI)

(*) Notice: Subject to any disclaimer, the term of this patent is extended or adjusted under 35 U.S.C. 154(b) by 676 days.

(21) Appl. No.: 12/622,897

(22) Filed: Nov. 20, 2009

(65) Prior Publication Data

US 2011/0120948 A1    May 26, 2011

(51) Int. Cl.
| | |
|---|---|
| B01D 11/04 | (2006.01) |
| C09C 1/44 | (2006.01) |
| C09C 1/46 | (2006.01) |
| C01B 31/04 | (2006.01) |
| B01D 47/02 | (2006.01) |

(52) U.S. Cl.
CPC .................................. B01D 47/021 (2013.01)
USPC ...... 210/638; 210/748.02; 210/749; 210/774; 210/805; 95/43; 95/44; 95/149; 423/460; 423/461

(58) Field of Classification Search
CPC .... B01D 11/02; B01D 11/04; B01D 11/0423; B01D 11/0492; C01B 31/02; C01B 31/0206; C01B 31/04; C01B 31/047; C01B 31/0438; C01B 31/0484; C01B 31/0492
USPC ........ 210/205, 511, 542, 634, 643; 95/43, 44, 95/149; 96/4, 243; 423/459, 460, 608, 423/622; 977/840, 842, 845
See application file for complete search history.

(56) References Cited

U.S. PATENT DOCUMENTS

| | | | | |
|---|---|---|---|---|
| 4,551,197 | A * | 11/1985 | Guilmette et al. | 216/93 |
| 5,415,129 | A * | 5/1995 | Calbick et al. | 117/104 |
| 5,607,647 | A * | 3/1997 | Kinkead | 422/122 |
| 7,784,502 | B2 * | 8/2010 | Gershtein et al. | 141/100 |
| 7,955,416 | B2 * | 6/2011 | Wyse et al. | 95/90 |
| 2002/0169345 | A1 * | 11/2002 | Johnson | 585/15 |
| 2008/0033178 | A1 * | 2/2008 | Wasserscheid et al. | 546/250 |
| 2008/0209876 | A1 * | 9/2008 | Miller | 55/522 |
| 2008/0210907 | A1 * | 9/2008 | Yoshida et al. | 252/301.36 |
| 2008/0271570 | A1 * | 11/2008 | Vieth et al. | 75/345 |
| 2009/0099016 | A1 * | 4/2009 | Carruthers et al. | 502/416 |
| 2009/0191352 | A1 * | 7/2009 | DuFaux et al. | 427/450 |
| 2009/0306394 | A1 * | 12/2009 | Torimoto et al. | 548/101 |

(Continued)

FOREIGN PATENT DOCUMENTS

| | | |
|---|---|---|
| CN | 2204192 Y | 8/1995 |
| CN | 101171064 A | 4/2008 |

(Continued)

OTHER PUBLICATIONS

V. Pushparaj et al, "Flexible Energy Storage Devices Based on Nanocomposite Paper", Pro. Nat. Aca. Sci., vol. 104, No. 34, (pp. 13574-13577), (2007).

(Continued)

*Primary Examiner* — Joseph Drodge
(74) *Attorney, Agent, or Firm* — Harrington & Smith

(57) ABSTRACT

A trap Including: an inlet configured to receive a fluid conveying nanostructures; ionic liquid configured to trap the nanostructures; and an outlet for the fluid.

7 Claims, 3 Drawing Sheets

(56) References Cited

U.S. PATENT DOCUMENTS

2010/0101983 A1* 4/2010 Butler et al. .............. 209/552
2010/0267549 A1* 10/2010 Finley ....................... 502/100
2012/0301625 A1* 11/2012 Nicholas ................... 427/457
2013/0071313 A1* 3/2013 Hamilton et al. .......... 423/448

FOREIGN PATENT DOCUMENTS

| EP | 1623751 A1 | 2/2006 |
|---|---|---|
| JP | 2003214138 | 7/2003 |
| JP | 2006000558 | 1/2006 |
| JP | 2006198512 | 8/2006 |
| TW | 200821025 | 5/2008 |
| WO | WO 2006103812 A1 | 10/2006 |
| WO | WO 2006121170 A1 | 11/2006 |

OTHER PUBLICATIONS

H. Sato, et al, "Characteristics of Ultrasonic Dispersion of Carbon Nanotubes Aided by Antifoam, Colloids and surfaces A: Physiochemical and Engineering Aspects", vol. 322, (pp. 103-107), (2008).

C. Poland et al., "Carbon Nanotubes Introduced into the Abdominal Cavity of Mice Show Asbestos-like Pathogenicity in a Pilot Study", nature nanotechnology, vol. 3, (pp. 423-428), (2008).

A.S. Arico et al., "Nanostructured Materials for Advanced Energy Conversion and Storage Devices", Nature materials, vol. 4, (pp. 366-377), (2005).

T. Fukushima et al., "Molecular Ordering of Organic Molten Salts Triggered by Single Wall Carbon Nanotubes", Science (pp. S1-S10), (2005).

* cited by examiner

TRAPPING NANOSTRUCTURES

FIELD OF THE INVENTION

Embodiments of the present invention relate to trapping nanostructures.

BACKGROUND TO THE INVENTION

Nanostructures are not naturally occurring, at least in large concentrations.

There is an interest in preventing human exposure to concentrations of nanostructures, particular exposure of the human respiratory system.

BRIEF DESCRIPTION OF VARIOUS EMBODIMENTS OF THE INVENTION

According to various, but not necessarily all, embodiments of the invention there is provided

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
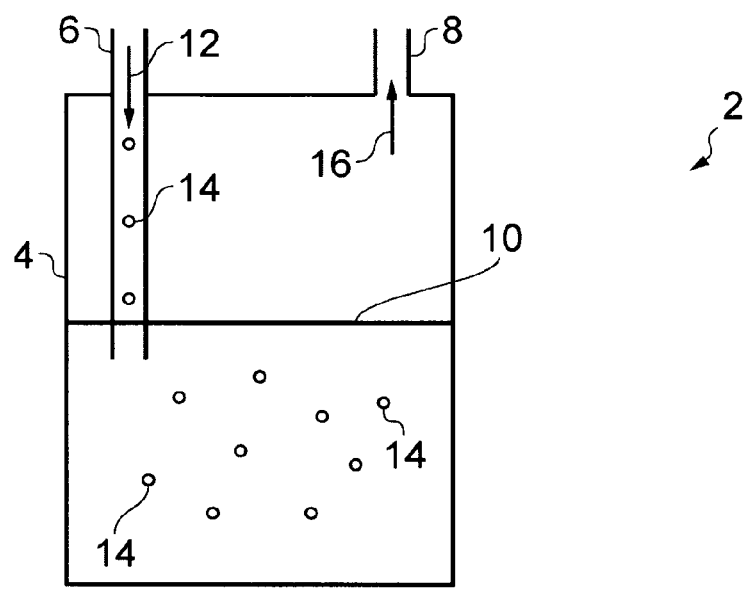
FIG. 1 an example of a trap that uses a liquid trapping material.
Figure 2:
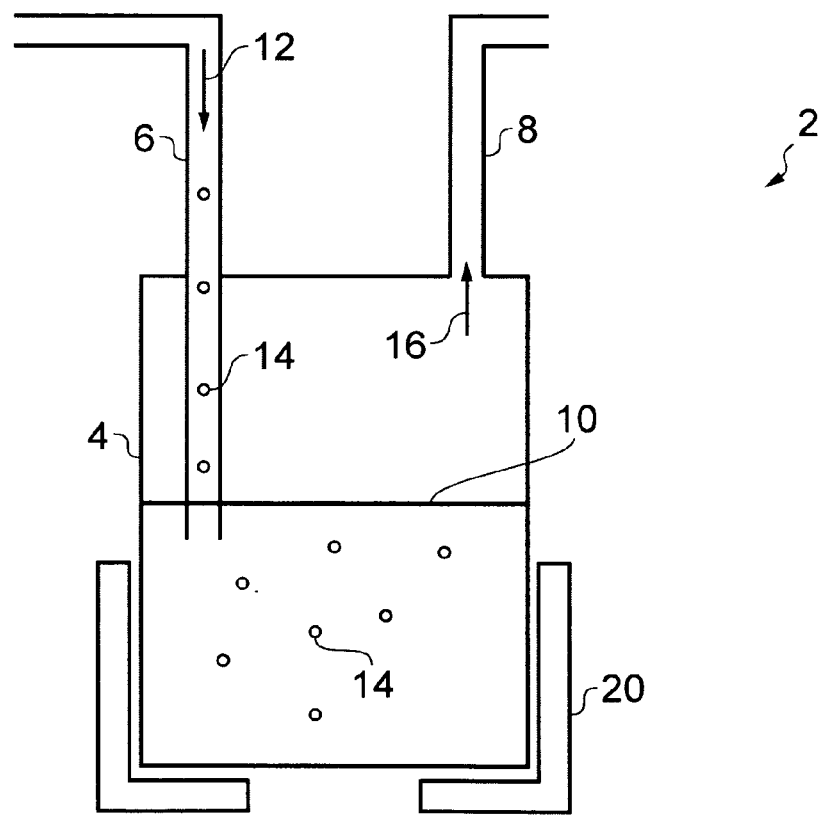
FIG. 2 illustrates an example of a trap similar to that illustrated in FIG. 1 but which additionally comprises a disperser.
Figure 3:
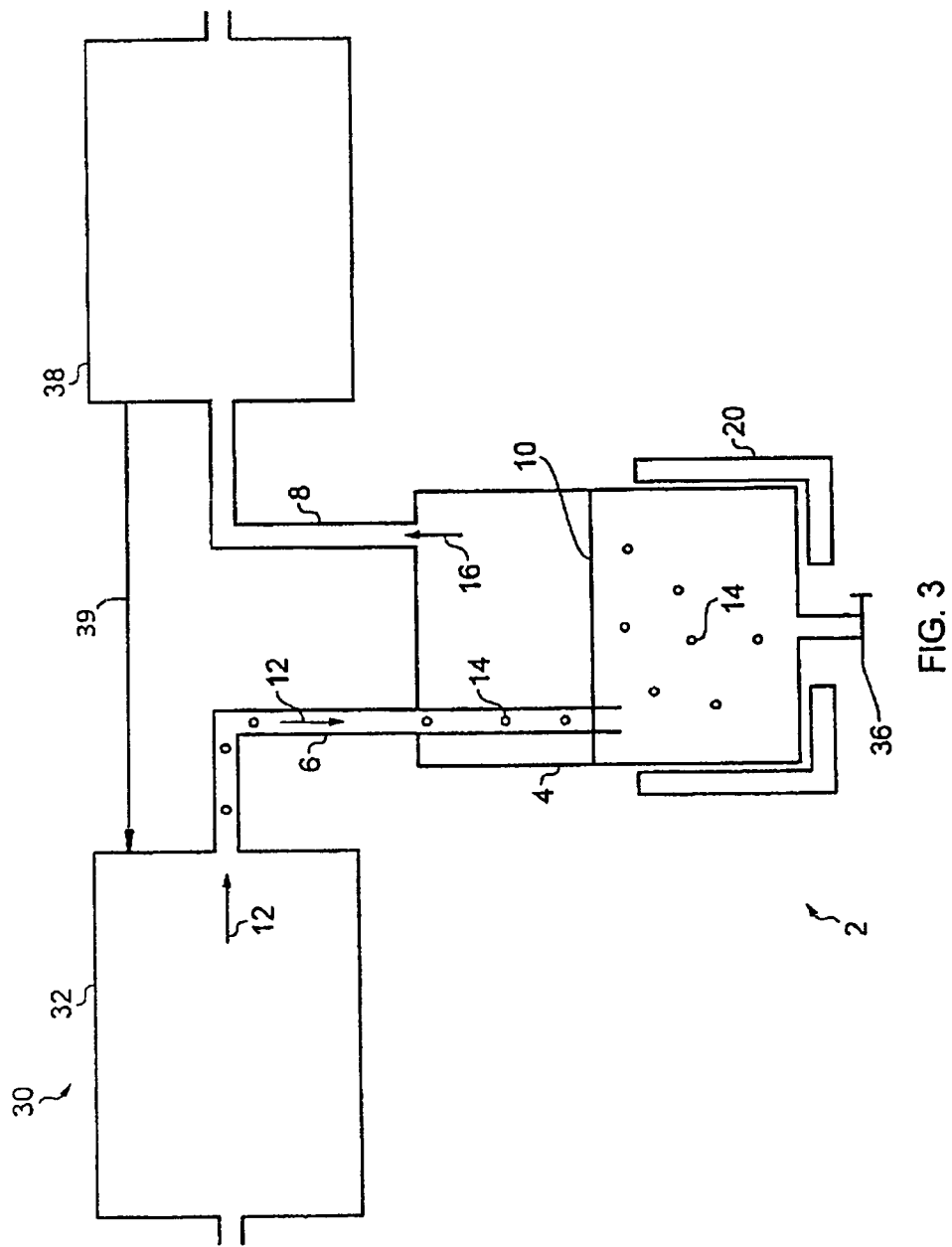
FIG. 3 schematically illustrates a nanostructure handling system comprising, for example, a trap similar to that illustrated in FIG. 2.

FIGS. 1, 2 and 3 schematically illustrates an example of a trap 2 that comprises: an inlet 6 for receiving a fluid 12 conveying nanostructures 14; trapping material 10 for trapping nanostructures 14; and an outlet 8 for the fluid.

The trapping material 10 traps nanostructures 14 that are present in the received fluid 12, so that the fluid 16 at the outlet 8 has less nanostructures 14 than the received fluid 12.

The purpose of the inlet 6 is to allow the fluid 12 conveying nanostructures to contact the trapping material 10 and the purpose of the outlet 8 is to allow the fluid 12 to move away from the trapping material 10 so that more fluid 12 conveying nanostructures can contact the trapping material 10. In some embodiments the inlet 6 and outlet 8 may be separate and in other embodiments it may be possible for a single large or small opening to operate as an inlet 6 and an outlet 8 e.g. at different times.

Improved contact between the trapping material 10 and the fluid 12 conveying nanostructures 14 may be achieved by passing the fluid 12 through the trapping material 10. If the trapping material 10 is solid, it may be arranged in a cellular or foam-like configuration so that the fluid 12 conveying nanostructures 14 can pass through the trapping material 10 and contact a large surface area presented by the trapping material 10. If the trapping material 10 is liquid and the fluid 12 conveying nanostructures 14 is gas, then the fluid 12 can, for example, be bubbled through the liquid trapping material 10.

Figure 4:
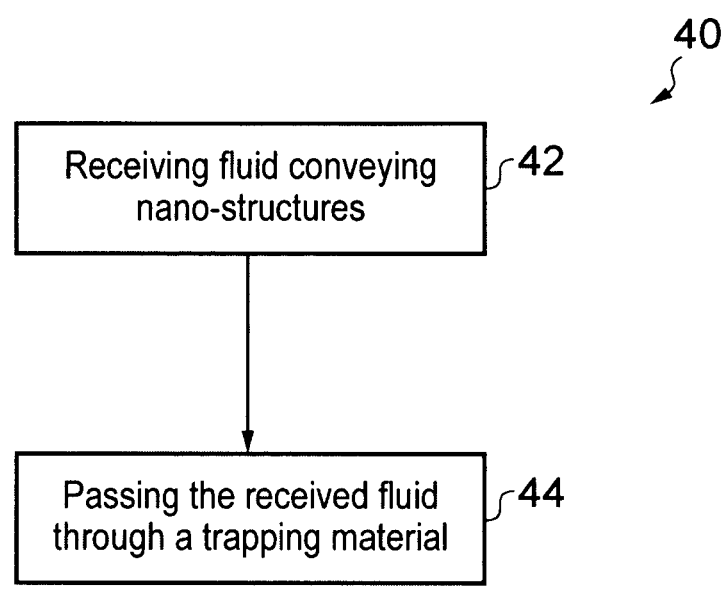
FIG. 4 schematically illustrates a method of trapping nanostructures.

The operation of the trap 2 may be understood from FIG. 4 which schematically illustrates a method 40. In the illustrated method, at block 42 a fluid 12 conveying nanostructures 14 is received at the trap 2. Then, at block 44, the received fluid 12 conveying nanostructures 14 is passed through the trapping material 10.

The incoming fluid 12 conveying nanostructures 14 passes through the trapping material 10. The trapping material 10 traps at least some of the nanostructures and the outgoing fluid 16 has less nanostructures 14 compared to the incoming fluid 6.

Referring to FIG. 1, there is illustrated one example of a trap 2 that uses a liquid trapping material 10. The trap 2 comprises a container 4 having an inlet 6 and a separate outlet 8. The container 4 houses liquid trapping material 10 for trapping nanostructures 14.

In the particular example trap illustrated in FIG. 1, the fluid 12 conveying nanostructures 14 is the gas phase and the inlet 6 comprises a conduit that extends past the liquid trapping material surface into the liquid, whereas the outlet 8 extends only into a void above the liquid surface and does not extend into the liquid trapping material 10. In this example, the container 4 is hermetically sealed except for the inlet 6 and the outlet 8. The pressure differential between the incoming fluid 12 and the outgoing fluid 16 results in the incoming fluid 12 being drawn through the liquid trapping material 10. This configuration is known as a 'bubble trap' as the incoming fluid 12 bubbles through the liquid trapping material 10.

However, in general, the fluid 12 may be a liquid, gas, gel or any combination. It may comprise solid structures in addition to nanostructures 14.

The nanostructures 14 are nano-scaled material structures that have at least one dimension that is less than 1 μm.

In some embodiments, the nanostructures 14 may be elongate nanostructures having at least one dimension less than 1 μm and another dimension greater than 10 μm.

In some embodiments, the nanostructures 14 may be hazardous fibres, where a hazardous fiber is defined as a structure that is thinner than 3 um, longer than 20 um and biopersistent in the lungs of a human (not dissolving or breaking down).

In some embodiments, the nanostructures 14 may include nanotubes (single-walled or multi-walled) and/or nanohorns.

The nanostructures 14 may be formed from inorganic material (not including carbon) or organic material (including carbon).

An organic nanostructure 14 may be formed from graphene. For example, an organic nanostructure 14 may be, for example, fullerene, a carbon nanotube or a carbon nanohorn.

An inorganic nanostructure 14 may be formed from ZnO or TiO2 for example. An inorganic nanostructure 14 may be, for example, a nanotube.

The nanostructures 14 may comprise particular electron orbital configurations that provide polarity. For example, the nanostructures 14 may comprises pairs of adjacent spn ($0 \leq n \leq 3$) hybridized electron orbitals that conjugate to form a π electron system. This may arise in the carbon to carbon 'double' bonds (sp2) of graphene, for example.

The trapping material 10 may be solid or a liquid. One suitable liquid is an ionic liquid. An ionic liquid is a molten ionic salt that is, at the temperature of use it is in a molten/liquid state. This does not imply that its state has necessarily been changed to the molten state. Temperatures of use may, for example, be room temperature or above room temperature or below room temperature. For example, the temperature of use may be as low as or lower than the boiling point of liquid Nitrogen (77 K; −196° C.) or as high as the temperature of exhaust from an incinerator e.g. 500° C. or any intermediate temperature.

The ionic liquid may be a room temperature ionic liquid (RTIL) which is an ionic liquid that is liquid at room temperature (293 K). Thus a room temperature ionic liquid (RTIL) is an ionic salt that is molten/liquid at room temperature.

Ionic salts are by definition strongly polar. The electron affinity of the anion compared to the cation results in ion formation.

An ionic liquid typically comprises small anions and bulky asymmetric organic cations. The cations comprise a plurality of paired adjacent spn (0≤n≤3) electron orbitals that form a conjugated π electron system. The ionic liquid may be aromatic having a plurality of delocalized conjugated π electron systems.

The cation may, for example, be selected from one or more of: imidazolium, pyridinium, pyridazinium, pyrazinium, oxazolium, triazolium, pyrazolium, pyrrolidinium, piperidinium, tetraalkylammonium or tetraalkylphosphonium.

The anion may, for example, be selected form one or more of: a chloride, a bromide, and iodide, a boron fluoride, a phosphorous fluoride, a nitrate, a sulphate, a hydrogen sulphate, a hydrogen carbonate, an aryl sulphonate, an alkyl sulphonate, a monofluoro alkyl sulphonate, a difluoroalkyl sulphonate, a carboxylate, a fluorinated carboxylate, $[PF_6]^-$, $[AsF_6]^-$, and $[SbF_6]^-$.

Thus one example of a RTIL is 1-butyl-3-methyl-imidazolium hexafluorophosphate [BMIM]. This ionic compound has a cation comprising Imidazole. Imidazole is a planar ring of $C_3H_4N_2$, which is a highly polar compound (dipole of over 1 debye). The ring is aromatic as it has a delocalized conjugated π electron system.

The polar nanostructures 14 present in the fluid 12 and the highly polar trapping material 10 interact and Van der Waals bonds are formed been the nanostructures 14 and the trapping material 10 via π-π electron system interaction. These bonds are sufficient to trap the nanostructures 14 within the trapping material 10.

If an ionic liquid is used as the trapping material 10 it may become a gel as it traps nanostructures. This improves ease of handling. Some ionic liquids are capable to trapping 5 wt % of nanostructures.

FIG. 2 illustrates an example of a trap 2 similar to that illustrated in FIG. 1 but which additionally comprises a disperser 20. The disperser 20 is configured to disperse the nanostructures within the trapping material 10. The disperser may, additionally, help untangle the nanostructures 14 should they become tangled.

The disperser 20 may be a mechanical, a chemical disperser or a thermodynamic disperser.

An example of a thermodynamic disperser is a heater. An example of a chemical disperser is a dispersing agent or a dispersing additive. A mechanical disperser may be a stirrer or a mixer or a source of ultrasound, for example. Ultrasound provides for contactless dispersion.

The disperser 20 may be continuously operated while the fluid 12 is provided by the inlet 6.

FIG. 3 schematically illustrates a nanostructure handling system 30. It comprises a trap 2 similar to that illustrated in FIG. 2.

The system 30 additionally comprises a source 32 which provides the fluid 12 conveying nanostructures 14 to the trap 2 and an optional sink 38 to which the fluid is provided by the trap 2.

The source 32 may be, for example, a product manufacturing apparatus or system used to manufacture a product or products comprising nanostructures 14. An atmosphere within the product manufacturing apparatus or system 32 may become contaminated with nanostructures 14 and the trap 2 is used to decontaminate the atmosphere. As an example, a high pressure may be generated in the manufacturing apparatus or system 32 that pushes the atmosphere comprising nanostructures 14 through the inlet 6 as fluid 12. Alternatively, a low pressure may be generated in the sink 38 which draws the atmosphere comprising nanostructures 14 through the inlet 6 as fluid 12. The atmosphere may then optionally be recycled from the sink 38 to the source 32 via a recycle line 39, as shown in FIG. 3.

The source 32 may be, for example, a nanostructure manufacturing apparatus or system used to manufacture nanostructures. The nanostructures may be generated using any suitable process. The manufactured nanostructures are typically generated with an atmosphere and the trap 2 is used to remove the nanostructures from the atmosphere. For example, a high pressure may be generated in the nanostructure manufacturing apparatus or system 32 that pushes the atmosphere comprising nanostructures through the inlet 6 as fluid 12. Alternatively, a low pressure may be generated in the sink 38 which draws the atmosphere comprising nanostructures 14 through the inlet 6 as fluid 12. The atmosphere may then optionally be recycled from the sink 38 to the source 32. In this embodiment, the nanostructures 14 are stored within the trapping material 10. The nanostructures 14 may therefore be stored and transported by storing and transporting the trapping material 10 comprising the nanostructures 14. The Fig illustrates a tap 36 that is positioned at the base of the container 4 for removing the trapping material 10 comprising nanostructures 14. The nanostructures 14 may later be recovered from the trapping material 10 by, for example, removing ionic liquid using acetone or by absorbing the ionic liquid by capillary action into a filter.

The source 32 may be, for example, a combustion chamber used to combust material. The nanostructures 14 may be generated as a by-product of the combustion process. The nanostructures 14 are typically generated within an atmosphere and the trap 2 is used to remove the nanostructures 14 from the atmosphere. For example, a high pressure may be generated in the nanostructure manufacturing apparatus or system 32 that pushes the atmosphere comprising nanostructures 14 through the inlet 6 as fluid 12. Alternatively, a low pressure may be generated in the sink 38 which draws the atmosphere comprising nanostructures 14 through the inlet 6 as fluid 12. The atmosphere may then optionally be recycled from the sink 38 to the source 32.

The combustion chamber 32 may, for example, be used to combust hydrocarbons. It may, for example, be part of an internal combustion engine or power plant.

The combustion chamber 32 may, for example, be an incineration chamber used for the destruction of product. The product for destruction may, for example, comprise nanostructures. The nanostructures 14 are released into the atmosphere of the combustion chamber 32 as contaminants and the trap 2 removes the nanostructure contaminants. In this embodiment, the sink 38 may comprise filters for additional cleaning of the fluid 16 before it is released into the Earth's atmosphere.

The incineration chamber 32 may be a low temperature incineration chamber. It may operate at a temperature less than 1300 degrees Celsius (1300 degrees Celsius guarantees destruction of carbon nanotubes). It may operate at a temperature less than 500 degrees Celsius (500 degrees Celsius is the temperature at which destruction of carbon nanotubes begins)

It will be appreciated that the ability of the trap 2 to reversibly trap nanostructures 14 allows the nanostructures 14 to be recycled.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
receiving a fluid conveying nanostructures, the nanostructures comprising graphene;
trapping the nanostructures using ionic liquid, the ionic liquid comprising a room temperature ionic liquid comprising an ionic salt;
recycling the nanostructures to a source of the nanostructures; and
exhausting the fluid;
wherein the nanostructures are reversibly trapped by $\pi$-$\pi$ electron system interactions.

2. A method as claimed in claim 1 further comprising recovering trapped nanostructures from the ionic liquid.

3. A method as claimed in claim 1 further comprising transporting or storing nanostructures as trapped nanostructures within the ionic liquid.

4. A method as claimed in claim 1, further comprising dispersing the nanostructures within the ionic liquid.

5. A method as claimed in claim 4, wherein dispersing the nanostructures comprises ultrasonically dispersing the nanostructures.

6. The method as claimed in claim 4, wherein dispersing the nanostructures comprises chemically dispersing the nanostructures using a dispersing agent or a dispersing additive.

7. The method as claimed in claim 4, wherein dispersing the nanostructures comprises thermodynamically dispersing the nanostructures using a heater.

* * * * *